Figure 1:
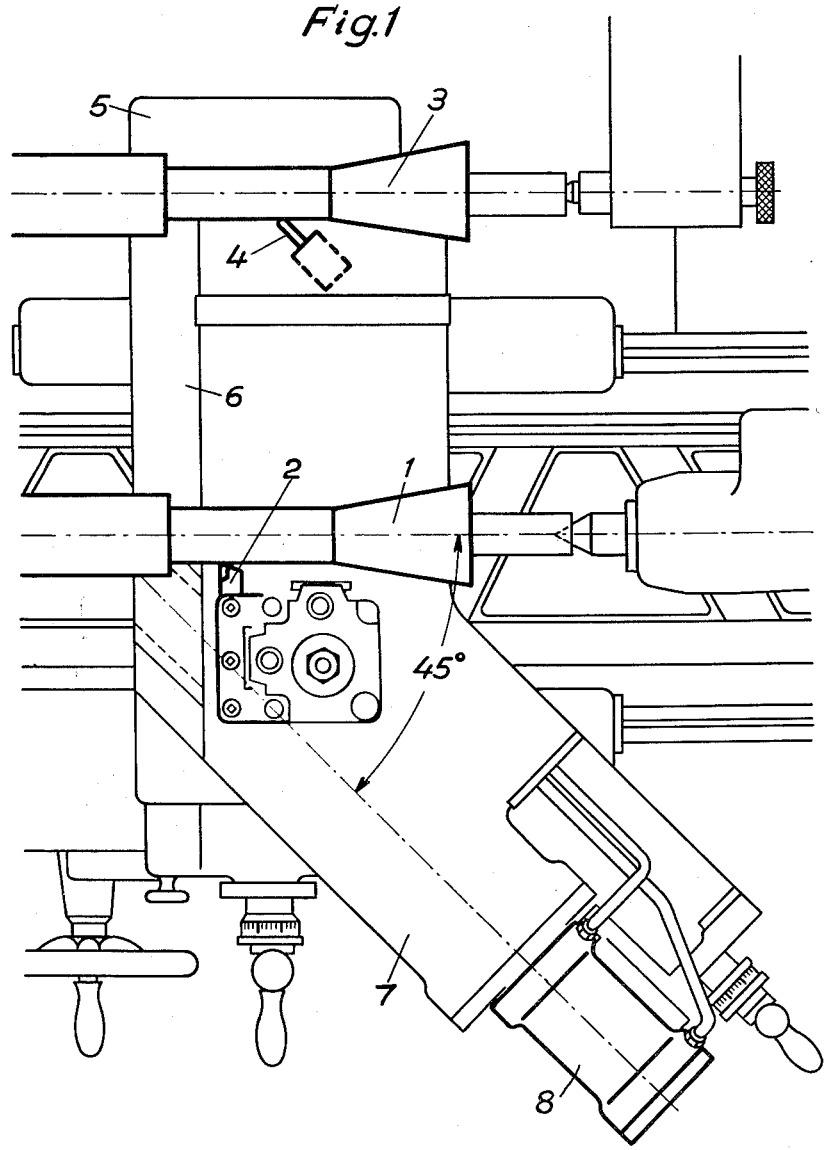

Dec. 26, 1961  A. GARDE ETAL  3,014,390
CONTROL EQUIPMENT FOR COPYING MACHINE TOOLS
Filed Dec. 28, 1954  2 Sheets-Sheet 1

Inventors
Aage Garde, Erik Persson
and Henning Schiott
By  *James Qiven*
 Attorney.

United States Patent Office 3,014,390
Patented Dec. 26, 1961

3,014,390
CONTROL EQUIPMENT FOR COPYING MACHINE TOOLS
Aage Garde, Erik Persson, and Henning Schiott, Vasteras, Sweden, assignors to Allmanna Svenska Elektriska Aktiebolaget, Vasteras, Sweden, a corporation of Sweden
Filed Dec. 28, 1954, Ser. No. 478,112
Claims priority, application Sweden Jan. 2, 1954
9 Claims. (Cl. 82—14)

The invention concerns the operation of copying machine tools wherein the cutting tool is controlled by a pattern, which is similar to the finished work-piece and which is traced by a feeler member fitted with a stylus. For this purpose a number of different control systems have been used. Amongst the systems, in which the cutting tool is governed by a continuously working control system merely hydraulic, pneumatic-hydraulic, electro-mechanical etc., systems are found, which differ from each other with respect to accuracy and speed. The hydraulic and pneumatic devices function, as a rule, in such a way that the stylus actuates the valve for a hydraulic motor, which, in turn, moves the cutting tool in the desired direction. Such a system functions without error, when the position of the tool in the controlled direction need not be changed in relation to the workpiece. In this case, actually, the hydraulic motor displacing the cutting tool is at rest, which means that the member controlling the hydraulic motor can be in its neutral position (zero-position). This means that the cutting tool and the pattern are consequently in the correct position in relation to each other. If, on the other hand, a working motion of a copying machine tool presumes that the hydraulic motor moves the cutting tool at a constant speed, the controlling member obviously must be in such a position, deviating from the neutral position, that the hydraulic motor carries out the desired motion. The fact that the controlling member in such working motions has to leave its neutral position presumes that the relative position between stylus and cutting tool must deviate from the zero-position or, in other words, that the cutting tool cannot exactly reproduce the configuration of the pattern and consequently a regulating error arises. It is true that it can be obtained by a strong amplification that the hydraulic motor gets a high speed for a little relative displacement between cutting tool and stylus, but this entails the risk that this control system being stable in principle, will become unstable owing to mechanical shortcomings.

According to the present invention, the mentioned disadvantages are avoided in that the cutting tool, at least in one of the main paths in which it shall be moved, is controlled by an electro-hydraulic control equipment containing at least two cascaded links with integral action. By the term "cascaded links" it is understood that the links are connected, in respect to each other, so that the output of one link forms the input to the next. The term "integral action" as used herein has the meaning given in paper 52-SA-29, paragraph 502, of the American Society of Mechanical Engineers, "Automatic Control Terminology," that is, "integral action" is that in which the final control element is positioned in accordance with a time integral function of the controlled variable. Depending on how many series-connected members with integral action are embodied in the control system, the hydraulic motor moving the cutting tool can either take up a certain position, move with a constant speed or a constant acceleration without the feeler member needing to deviate from the zero-position, in which position the control system is in balance. As a consequence, the regulating error is zero in principle even at the mentioned movements of the cutting tool. Such a movement with a constant speed takes place for instance in copying lathes, when a cone or a 90° shoulder has to be turned. An electro-hydraulic control system has the advantage over other control methods of being, at the same time, rapid, accurate and easy to stabilize against hunting. The increase of accuracy, principally obtained by inserting at least two cascaded links with integral action, can, therefore, be completely exploited in control systems of this type.

Figure 2:
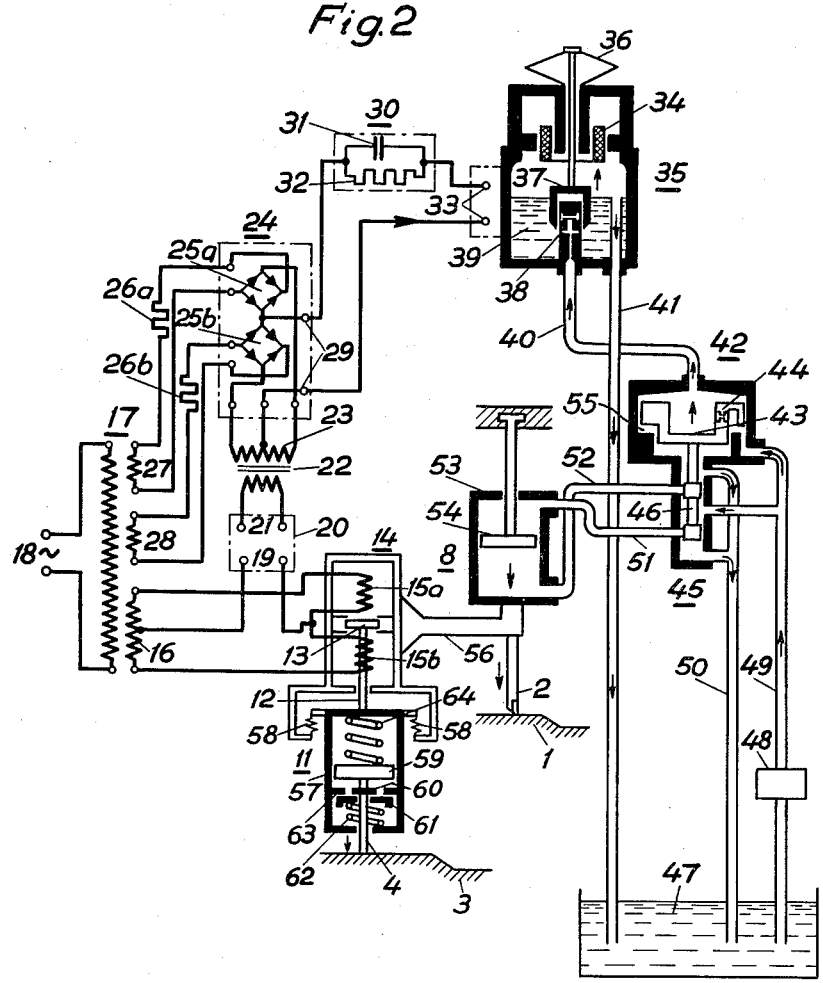

The design and the function of the arrangement are described with the guidance of FIGS. 1 and 2. Of these figures, FIG. 1 shows the placing of the feeler member and the cutting tool on a copying lathe. FIG. 2 shows the design of the electro-hydraulic control equipment.

FIG. 1 contains those parts of a copying lathe, which are of interest in the present connection. The work-piece is indicated by 1, which is held between two centres, one of which is visible. The piece is turned by means of the lathe tool 2 fixed on the top slide 7. 3 indicates a copying pattern, with which a feeler member with its stylus 4 makes contact. The feeler member with stylus 4 is also mounted on the top slide 7. By means of the top slide the lathe tool and the stylus are moved along an axis forming a 45° angle with the longitudinal axis of the lathe. Along this axis the top slide can be moved by means of the hydraulic motor 8. The carriage 5 runs in a conventional way in the longitudinal direction of the lathe and is not actuated by the electro-hydraulic control system. The cross-slide 6 makes the displacement of the lathe tool possible in transversal direction but is, as a rule, not used for copying turning. The operation of the top slide in a 45° angle has the advantage that a 90° shoulder can be turned without stopping the longitudinal feeding. The fact is that by suitably choosing the speed, at which the top slide is moved in relation to the speed for the longitudinal feed, a resulting movement perpendicular to the longitudinal axis of the lathe is obtained.

In FIG. 2, which shows the control equipment there is again the work-piece 1, with the lathe tool 2, and the copying pattern 3 with the stylus 4. This stylus 4 actuates a controlling body 13, being part of a feeler member 14, through a damping device 11 and a shaft 12. Under normal working conditions the damping device forms a rigid connection between the stylus 4 and the shaft 12. The feeler member 14 is mounted on the top slide 7 in FIG. 1 and is therefore moved simultaneously with the tool. The feeler member 14 might however be coupled with the lathe tool 2 in another way, e.g. by an electrical connection instead of the mechanical connection 56. shown in the drawing. By moving the controlling body 13 in the longitudinal direction of the shaft 12 in one or the other direction, the value of the inductances 15a and 15b is changed in such a way that one of them is increased and the other one decreased. The inductances 15a and 15b each form a branch of an A.C. bridge, the other branches comprising a pair of secondary windings 16 of the transformer 17, fed from the A.C. network 18. The diagonal circuit of the bridge is formed between the middle point of the winding 16 and the joining point of the inductances 15a and 15b and comprises the input terminals 19 of the amplifier 20. When the controlling body 13 is in its zero position the bridge is in balance and zero-voltage will appear across the terminals 19; when the controlling body deviates from the zero position the condition of the A.C. bridge is changed due to the alteration of the inductances. In consequence a voltage appears across the input 19, which voltage in an amplified form reappears across the output 21 of the amplifier 20. Via a transformer 22 with the secondary winding 23 provided with a middle terminal, this voltage is transferred to the rectifier device 24, where the A.C. current is rectified with regard to its phase position. This rectification is carried out in a way known per se by means of the rectifier bridges 25a and 25b, which with their D.C. terminals, via the resistors 26a and 26b, are connected to the secondary windings 27 and 28 of the transformer 17. The A.C. terminals of the rectifiers are, partly directly and partly via the circuit connected to the terminals 29, coupled with the secondary part 23 of the transformer 22. The different branches of the rectifiers 25a and 25b are opened and closed in synchronism with the A.C. voltage supplied by the transformer windings 27 and 28. Depending on how the voltage supplied from the secondary part 23 of the transformer 22 is in relation to the voltage on the secondary windings 27 and 28 of the transformer 17, i.e. depending on the direction in which the controlling body 13 in the feeler member 14 is moved, the current derived from the terminals 29 of the rectifier device 24 has a positive or a negative direction. This D.C. is directed via the phase-lead network 30, consisting of a capacitor 31 and a resistor 32, to the input terminals 33 of the control device 35. In this device the coil 34 is connected to the terminals 33, which coil actuates the throttle sleeve 37 suspended in a spring 36. This throttle sleeve controls the drop in pressure of the oil flowing through channels 38 in a member surrounded by the sleeve 37 and lying below the surface of oil 39 in the control device 35. The channels 38 are connected by a pipe 40 to the space above a differential piston 43 in an auxiliary hydraulic servomotor 42. This servomotor 42, together with the control device 35 forms the first of two cascaded links with integral action. A pump 48 supplies oil under pressure to the servomotor 42 from a reservoir 47, through a pipe 49, there being a throttling orifice 44 in the piston 43 which allows oil under pressure to pass from the pipe 49 to the pipe 40 and into the control device 35. Oil returns to the reservoir 47 from the control device 35 through the pipe 41. The area of the piston 43 facing the space above the piston is twice as large as the effective area of the underside of the piston facing the annular space 55 which communicates with pipe 49.

When the controlling body 13 is in its zero-position and the current supplied by the rectifier device 24 to the coil 34 in the electro-hydraulic control device 35 is zero, the throttle sleeve 37 is in such a middle position that the pressure drop across the flowing openings 38 is equal to the pressure drop in the throttle sleeve 44. Thus the pressure above the differential piston 43 is half as high as the pressure below, and as the surface of the piston in the space above is double the size of the effective surface in the space below, the piston 43 stands still in the position, which it has taken up on a preceding control action. If the channels 38 open further, the pressure drop across them is decreased, whereby the pressure in the inlet pipe 40 falls. As the pressure in the pipe 40 has decreased, the differential piston 43 in the auxiliary hydraulic motor 42 moves upwards. If, on the other hand, the throttle sleeve 37 actuated by the coil 34 in the device 35 closes the channels 38, the greater part of the pressure drop is found here, whilst the throttle sleeve 44 in the auxiliary motor 42 has a lower pressure drop. The piston 43 in the auxiliary motor is, therefore, moved downwards.

The movable part 46 in the main motor valve 45 is connected with the piston 43. This movable part controls the flowing of the compressed oil through the channels 51 and 52 into the main hydraulic motor 8 and this motor, together with the valve 45, forms the second of two cascaded links with integral action. If the piston 43 and the movable part 46 are in the shown position, oil is neither carried to the channel 51 nor to the channel 52. If the piston is moved a certain amount upwards, compressed oil is, however, carried from the magazine 47 via the pump 48 and the pressure pipe 49 to the channel 52 and the lower part of the motor 8. Hereby the cylinder 53 is moved downwards in relation to its piston 54, and the lathe tool 2 approaches the work-piece 1 with a constant speed. The opposite motion direction is obtained, when oil is carried to the upper part of the cylinder of the main motor 8, i.e. when the movable part 46 in the main motor valve is below the drawn position.

The equipment functions in the following way. It is assumed that, to begin with, a cylindrical surface has to be turned, i.e. that the lathe tool has to move parallel to the longitudinal axis of the work-piece. If the tool is in its proper position in relation to the pattern, the controlling body 13 is in its zero-position, when the stylus is in contact with the pattern, no voltage is found therefore across the terminals 19 in the diagonal circuit of the bridge. Thus the current supplied to the coil 34 in the electro-hydraulic control device 35 is zero, and the throttle sleeve 37 is in its neutral position. Therefore, the piston 43 in the main motor valve stands still in such a position that the movable part 46 completely throttles the oil flow to the main motor 8. The cylinder of this motor thus stands still in relation to its piston, and the top slide does not move. If now the stylus traces that top slide and thus the tool is not sufficiently near the pattern, the shaft 12 with the controlling body 13 moves downwards under the mentioned presumption that the damping device 11 is rigid, causing such an equalizing current in the A.C. bridge that is, after amplifying in the amplifier 20 and phase-dependent rectifying in the rectifying device 24, supplies a current in the direction of the arrow towards the input terminals 33 of the electro-hydraulic control device 35. The throttle sleeve 37 then moves upwards, whereby the pressure in the inlet pipe 40 is decreased, and the differential piston 43 in the auxiliary motor 42 also moves upwards. This movement takes place with a speed proportional to the deviation of the throttle sleeve 37 from the zero-position. This means that the distance traversed by the piston 43 is the integrated value of this deviation during the time in question the assembly forming a member with integral action. By means of the upward movement of the piston 43, the main motor valve 45 releases the supply of compressed oil through the channel 52, so that the cylinder 53 of the main motor 8, and thereby the slide 7 (56) with the cutting tool 2, is moved nearer to the work-piece 1. This displacement is carried out with a speed proportional to the deviation of the piston 43 from the zero-position, and the displacement of the main motor is, therefore, the integrated value of this deviation during the time in question. As the top slide by the described control action is moved nearer to the work-piece, the fixed part of the feeler member 14 has also been moved nearer to the pattern via the connection 56. By this motion the original relative position between the controlling body 13 and the inductances 15 of the feeler member is restored, the balance in the A.C. bridge is also restored. Hereby the throttle sleeve 37 returns to its neutral position, and the piston 43 ceases to move. In order to make the piston 43, without hunting, stop in the position, in which the oil supply to the main motor 8 is stopped, the phase-lead network 30 is inserted in this circuit before the coil 34. As the current through the capacitor 31 is proportional to the rate of change of the voltage supplied to the capacitor a current component of a direction, counteracting hunting, is supplied to the control device 35. This ensures a return of the piston 43 towards its neutral position in proper time without hunting.

The main advantage of the control equipment according to the invention appears, if now the turning of a cone or of a 90° shoulder is considered. At such a turning the top slide has to move in direction towards or away from the work-piece with a constant speed. The integrating main member of the control equipment, i.e., the main servomotor 8, then moves with a constant speed for instance in the arrow direction towards the work-piece. This presumes that compressed oil is flowing in through the channel 52 and that the piston 43 thus takes up a certain position above the normal position shown in the figure. To keep the piston 43 still, the throttle sleeve 37 must take up its neutral position, which presumes that the current supplied to the terminals 33 must be zero. From this it is evident that the controlling body 13 stands in its zero-position and that thus the relative distance between the cutting tool 2 and the pattern 3 is zero. The slide can, therefore, move with the desired speed without an undesired distance occurring between the tool and the pattern, i.e. without a regulating error arising. This has consequently has been obtained by inserting the other member with integral action in the form of the auxiliary servomotor 42, which can take up an arbitrarily fixed position and thus via the main-motor-valve control the main servomotor can move with a constant speed without a deviation from the zero-position being needed at the feeler member 14.

If the slide and thus the main servomotor is required to move with a constant acceleration or retardation without an initiating distance between the cutting tool and the pattern 3, the control system must be provided with a third member with integral action. Then the first member, e.g. controlled by an electro-hydraulic control device, is in a certain position, which, however, deviates from the zero-position. Hereby the power supply towards another motor acting as integrating member is controlled in such a way that it moves with a constant speed. If this other servomotor by means of a valve controls the final main motor, the valve moves with a constant speed, and thus the main servomotor with a constant acceleration or retardation. In the same way a fourth integrating member should be necessary, if the change in acceleration or retardation at the main motor has to be constant. In practice it is not necessary to use more than two members with integral action. It is true that a principal regulating error occurs when finishing an arbitrarily formed surface, but the regulating error, arising at changes in speed, can be held sufficiently small by suitable amplifying.

Control equipment containing more than one member with integral action are more difficult to stabilize against hunting than equipment with only one member with integral action. Whilst a system of the last mentioned type is stable in principle, an equipment according to the invention requires special stabilizing means. For the stabilization at smaller changes in position the phase-lead network 30 has been mentioned and described above. Further phase-lead networks must be added when increasing the number of members with integral action. These phase-lead networks, however, cannot completely eliminate the risk of hunting, which occurs, when the top slide at the application of the tool approaches the work-piece and the pattern at its highest speed. Then there is the risk that the control signal initiating the retardation is too late, whereby the tool attacks the work-piece too heavily and thereafter carries out a hunting motion before taking up its correct position. This disadvantage is avoided according to a modification of the invention by means of a damping device 11 inserted between the stylus 4 and the controlling body 13 of the feeler member 14. Said device acts as a rigid connection for small deviations from the balance positions. At deviations from the balance position larger than the stroke of the controlling body, it represents, however, a flexible connection. This influences the controlling body in such a way that it is brought to a position, initiating retardation or acceleration, depending on whether the relative speed between the stylus 4 and the controlling body 13 is above or below a value predetermined for each direction. As the damping device 11 acts as a rigid connection at small deviations from the balance position, it could be left out of consideration, under normal working motions as described above. Instead of this it could be presumed that the stylus 4 directly actuates the shaft 12 and the controlling body 13. At the application of the tool, the stylus 4 touching the pattern 3 but because the deviation from the balance position is larger than the stroke of the controlling body, the relative speed, with which the slide approaches the work-piece and the pattern, i.e. the relative speed between stylus and controlling body, will determine the position of the controlling body 13.

The damping device 11 mainly consists of a cylinder 57 filled with oil or another damping medium. The cylinder 57, on which the shaft for the controlling body 13 is fixed, is connected with the casing of the feeler member 14 via the springs 58. The springs 58 tend to draw the cylinder casing 57 downwards. In the cylinder there is a piston 59, in which the stylus 4 is fixed. The stylus is fitted with a disc 60, which can freely pass the shoulder 63. The disc 60 carries, at the downward motion of the piston, the plate 61, which hereby compresses the spring 62. If the piston 59 moves upwards, the spring 62 expands, until the plate 61 has reached the shoulder 63. If the piston 59 moves further upwards, the spring 62 has become inactive, and the piston is only under the influence of the spring 64. Should the piston 59 be moved downwards away from the shown position, it stands under the influence of the difference between the spring force 64 and the spring force 62. Shall the piston, however, be moved upwards from the shown position, it is only under the influence of the spring force 64. From this it is evident that the force acting on the stylus 4 must be changed with an amount equal to the force of the spring 62 in the shown position, if the piston has to be moved upwards or downwards from the shown position, i.e. that position, where the plate 61 bears against the shoulder 63 and where the disc 60 bears against the plate 61. This means that the piston 59 cannot move from a certain characteristic middle position, i.e. that the connection between the stylus 4 and the cylinder casing 57 and thus the controlling body 13 can be considered being rigid, unless the force exerted on the stylus from outside is altered by a certain value. The device is so designed that this value is not exceeded under normal control conditions. At the application of the tool in the direction towards the work-piece, however, when the stylus is still in contact with the pattern, the piston in the cylinder moves downwards, until the force of the spring 64 is equal to the force of the spring 62. The stylus 4 is thus drawn out from the cylinder more than normally. At the same time the springs 58 cause the cylinder 57 to move a little downwards in relation to the casing of the feeler member 14. In consequence the controlling body 13 stands in its lowest position and forces the main servomotor 8 to move the top slide, bearing the tool and the feeler member, downwards with maximum speed. When now the slide has passed so far that the stylus touches the pattern, an upward force is exerted on the piston 59. As the relative speed between slide and pattern is high, the oil in the damping cylinder cannot flow away sufficiently quickly, but an upward force is exerted on the cylinder 57 and the controlling body 13. This is then brought past a middle position to a working position, where it initiates a retardation in the control system. Hereby the speed of the slide is decreased and thus also the hydraulic force, with which the piston 59 influences the cylinder 57 and the controlling body 13. The retardation of the slide is continued, until the power transferred to the controlling body has decreased to such a value that the controlling body takes up its zero-position. Then the control action ceases, and the slide continues with the present, reduced speed. If this speed be too low, the spring forces in the damping device 11 exceed the hydraulic force, and an accelerating signal is given by the controlling body. The result will be that the slide is made to approach the proper working position of the tool with a predetermined speed, which is suitable for beginning the real working process without hunting. In order to obtain a power balance of the described type, the openings, through which the oil in the cylinder 57 can flow from one side of the piston 59 to the other are suitably designed in such a way that the power transmitted from piston to cylinder varies substantially linearly to the relative speed between piston and cylinder. For the damping device as a separate component this means that the relative speed varies substantially linearly to the power transferred beween piston and cylinder.

In the shown example, the arrangement comprises only one control equipment controlling the top slide motion in a certain main path. The motion of the carriage in the longitudinal path of the lathe takes place in an adopted way. There are, however, copying processes, which are two-dimensional, and where the cutting tool in more than one main direction has to be moved by means of control equipments. This applies especially to milling machines. In these cases the cutting tool is each of the main paths is governed by an electro-hydraulic control system. Each of these control systems contains here at least two members with integral action.

It is of no importance to the present invention, whether the members with integral action, being arranged before the main servomotor in the control system, are electric or hydraulic servomotors. According to the invention, however, the first motor in the chain moves under the influence of an electrically actuated control device. The electric operation makes it possible to use an electric feeler member coupled with the stylus. Hereby the mentioned advantages are obtained in respect of accuracy, amplification and stabilization. According to the invention, the last servomotor in the chain functions hydraulically, so that the desired operation forces can be obtained with desired speed. Of course, electric feeler members of another construction than the one described here can be used. For instance electro-optical devices can be used as feeler members.

We claim as our invention:

1. Control equipment for a copying machine tool, said machine tool comprising a cutting tool and a pattern reproducing the desired work-piece, said equipment comprising an electrical feeler member influencing the movement of said cutting tool, at least in one of the directions in which it shall be moved, by a control signal upon deviation of the cutting tool from its desired position in respect to the pattern, a first servo-control means with integral action and at least one further servo-control means with integral action, the output of said feeler member means being operatively connected with the input of said first servo-control means for altering its speed upon a control signal from said feeler member, and the output of said first servo-control means being operatively connected to the input of said further servo-control means for altering its speed upon a change in position of said first servo-control means, and the output of said further servo-control means being operatively connected to said cutting tool for moving the cutting tool dependent on the position of said further servo-control means.

2. Control equipment according to claim 1, said first servo-control means comprising a control device electrically actuated by said feeler member and controlling the speed of a hydraulic auxiliary servomotor and said further servo-control means comprising a hydraulic control device, actuated by said hydraulic auxiliary servomotor and controlling the speed of a hydraulic mean servomotor for moving said cutting tool.

3. Control equipment according to claim 1, said feeler member comprising a stylus operatively connected to a magnetic controlling body and at least one impedance, the position of said controlling body being responsive to the position of said stylus and altering the value of said impedance upon movement of said stylus.

4. Control equipment according to claim 1, comprising an electrical amplifier device operatively connected between the output of said feeler member and the input of said first servo-control means, said amplifier device comprising an A.C. bridge and a phase-dependent rectifier, said A.C. bridge including at least one impedance, which is part of said feeler member and the value of which is altered responsive to the movement of the feeler member, and said A.C. bridge having a diagonal circuit, connected to said rectifier for supplying said rectifier with a current responsive to the altering of said impedance.

5. Control equipment according to claim 1, comprising an electrical phase-lead network operatively connected between the output of said feeler member and the input of said first servo-control means for supplying a stabilizing signal to said first servo-control means upon a change in the output signal from said feeler member.

6. Control equipment according to claim 1, said feeler member comprising a stylus, tracing the shape of said pattern, a casing attached to the cutting tool, a controlling body responsive to the movement of said stylus for supplying a control signal to said first servo-control means and a damping device inserted between said stylus and said controlling body for the formation of a flexible connection between said stylus and said controlling body, upon the movement of said stylus being larger than the working range of said controlling body.

7. Control equipment according to claim 6, said damping device comprising a cylinder filled with a damping medium, attached to said controlling body, and through first spring means, attached to the casing of the feeler member, second and third spring means in said cylinder, a piston being movably clamped between said second and third spring means, said second and third spring means counteracting each other and said third spring means actuating the piston within a part of the working range of said piston only.

8. Control equipment according to claim 7, said damping device comprising passage means in said cylinder between one side of the piston and the other, for passing the damping medium slowly between these sides upon movement of the piston and exerting a force on said cylinder by the damping medium, dependent on the relative speed between said piston and said cylinder.

9. Control equipment for use with duplicating or copying machine tools in which the movement of the cutting tool is influenced by a feeler member coupled thereto and adapted to move along a pattern to reproduce the desired work-piece, comprising electro-hydraulic control means containing at least two links with integral action, the output of said first link forming the input to the next of said links, and means whereby the cutting tool in one of its directions of movement is controlled by said control means.

References Cited in the file of this patent

UNITED STATES PATENTS

| | | |
|---|---|---|
| 2,313,989 | Caldwell et al. | Mar. 16, 1943 |
| 2,389,594 | Caldwell | Nov. 27, 1945 |
| 2,557,824 | Hornfeck | June 19, 1951 |
| 2,603,117 | Turchan | July 15, 1952 |
| 2,615,466 | Garde | Oct. 28, 1952 |
| 2,674,232 | Mason | Apr. 6, 1954 |
| 2,722,198 | Macgeorge | Nov. 1, 1955 |

FOREIGN PATENTS

| | | |
|---|---|---|
| 894,067 | Germany | Oct. 22, 1953 |